United States Patent [19]

Palermiti

[11] Patent Number: 5,194,280

[45] Date of Patent: * Mar. 16, 1993

[54] METHOD OF MANUFACTURING A JUICE CONCENTRATE

[75] Inventor: Frank M. Palermiti, Indialantic, Fla.

[73] Assignee: F & MP Research & Development Laboratories, Inc., Indialantic, Fla.

[*] Notice: The portion of the term of this patent subsequent to Jun. 2, 2009 has been disclaimed.

[21] Appl. No.: 793,159

[22] Filed: Nov. 18, 1991

Related U.S. Application Data

[63] Continuation-in-part of Ser. No. 729,599, Jul. 15, 1991, Pat. No. 5,118,517.

[51] Int. Cl.$^5$ ............................................. A23L 2/08
[52] U.S. Cl. .................. 426/330.5; 426/443; 426/591; 426/599
[58] Field of Search ............ 426/330.5, 384, 442, 426/443, 591, 599

[56] References Cited

U.S. PATENT DOCUMENTS

| | | | |
|---|---|---|---|
| 3,518,344 | 6/1970 | Welsh | 426/591 |
| 3,719,599 | 3/1973 | Crivellaro | 426/591 |
| 4,004,036 | 1/1977 | Schmitt | 426/591 |
| 4,112,130 | 9/1978 | Gupta | 426/599 |
| 4,132,775 | 1/1979 | Volenec | 424/89 |
| 4,211,843 | 7/1980 | Dubreuil | 435/2 |
| 4,374,865 | 2/1983 | Strobel | 426/384 |
| 4,414,198 | 11/1983 | Michaelson | 426/591 |
| 4,622,227 | 11/1986 | Saleeb | 426/591 |
| 4,659,569 | 4/1987 | Mitsuhashi | 424/89 |
| 4,877,634 | 10/1989 | Pucci | 426/658 |
| 4,938,971 | 7/1990 | Chapdelaine | 426/443 |
| 5,026,566 | 6/1991 | Roser | 426/599 |
| 5,118,517 | 6/1992 | Palermiti | 426/384 |

Primary Examiner—Carolyn Paden
Attorney, Agent, or Firm—Rogers & Killeen

[57] ABSTRACT

A method of manufacturing a concentrate from juice that may be used to make a powder that can be reconstituted as a juice drink by addition of water to the powder or to make a taffy-like solid that may be consumed without being reconstituted and in which the juice is freeze or spray dried, includes the use of lubricants and/or dextran to improve the texture of the dried juice so that it may be packaged and stored for later consumption.

31 Claims, No Drawings

METHOD OF MANUFACTURING A JUICE CONCENTRATE

BACKGROUND OF THE INVENTION

This application is a continuation-in-part of U.S. Ser. No. 729,599 now U.S. Pat. No. 5,118,517 entitled "A Method Manufacturing Powdered Fruit Juice Using Dextran."

The present invention relates to a method of manufacturing a juice concentrate that may have various uses. For example, the juice concentrate can be used to make a powder that may be reconstituted as a juice drink by addition of water to the powder, or may used to make a taffy-like solid. More specifically, the invention relates to the use of lubricants and dextran to allow the juices to be freeze or spray dried so that they are amenable to packaging and storage.

The terms "drying", "dried", etc. as used herein refer to conventional techniques for both freeze and spray drying by which water is removed from the juice.

The term "powder" refers to a substance with loose solid granules with diameters less than about one-quarter inch.

The term "lubricant" refers to food grade stearates, such as zinc stearate and calcium stearate, and to food grade CABO-SIL TM. The product sold under the trademark CABO-SIL is a fused silicate of $SiO_2$. It is known to use lubricants in food products, but not for allowing juices to be dried. See, for example, the U.S. Pat. Nos. 4,156,021 and 4,089,981 to Richardson in which stearates are used as a water repellant and in simulated food products.

The term "dextran" refers to water soluble polymers having α-D-glucopyranosyl units polymerized predominately in a α, 1→6 linkage. Dextran polymers may have molecular weights ranging from 10,000 to several million. Typically, the dextran polymers are synthesized and fractionated so as to produce dextran polymers having a predetermined range of molecular weights.

Dextran has various uses depending on its molecular weight. For example, high purity, USP grade dextrans (1,000,000–40,000,000 molecular weight) have found application as surgical sponges. Clinical grade dextrans (40,000–75,000 molecular weight) have found extensive use as blood volume expanders. At lower molecular weights it has found use as a stabilizer or bodying agent in foods. For example, complex mixtures containing dextran have been used as a thickeners for powdered milk (see U.S. Pat. No. 4,855,149 to Pucci, et al.), and as stabilizers for juice powders (See U.S. Pat. No. 4,996,196 to Mitsuhashi, et al.).

It has long been a goal of the food industry to produce a powdered drink that tastes the same as real juice. It has been a further goal to be able to make such a powdered drink from the juice of real fruits and vegetables. The term "juice" as used herein refers to the liquid in fruits and vegetables.

Attempts to produce a powder from juice have not been successful because traditional powder rendering processes cause the juice to become a sticky, nonfree-flowing product, rather than a powder. For example, merely freeze drying or spray drying the juice does not produce the sought after powder because these processes do not powderize the fructose in the juice.

It has been a further goal of the food industry to produce a wholesome snack product from real fruits and vegetables without including significant amounts of additives that may be unattractive to the consumer. As with the powdered juice product, the results have been unsuccessful.

The method of the present invention avoids the problems of the prior art by using lubricants and/or dextran to make the texture of the dried juice amenable to packaging and storage. Further, and perhaps more significantly, the products produced from the concentrate manufactured by the method of the present invention taste like real juice.

Accordingly it is an object of the present invention to provide a novel method of manufacturing a juice concentrate that may be used to make various juice products having the taste of real juice.

It is a further object of the present invention to provide a novel method of manufacturing a juice concentrate in which lubricants and/or dextran are used to make a dried juice amenable to packaging and storage.

It is another object of the present invention to provide a novel method of manufacturing a juice concentrate that can be used to make a powder that may be reconstituted as a juice by adding water thereto.

It is still another object of the present invention to provide a novel method of manufacturing a juice concentrate that can be used to make a taffy-like solid that may be consumed without being reconstituted.

These and other objects and advantages of the present invention will be readily apparent to one skilled in the art to which the invention pertains from a perusal of the claims and of the following detailed description of preferred embodiments.

DESCRIPTION FOR PREFERRED EMBODIMENTS

The present invention uses lubricants and/or dextran to condition the juice so that the dried juice may be amenable to packaging and storage for later consumption. As will be seen, a juice may be conditioned by adding lubricants to the juice before or after drying, and by adding the lubricants either internally (mixed with the juice before drying) or externally (applied to the surface of the dried juice).

While the dextran is not required in all embodiments of the present invention, when used, the dextran may be added to the juice before or after drying, by adding the dextran either internally or externally and may be used instead of the lubricants (for which U.S. Pat. No. 5,118,517 is incorporated by reference) or, as in the preferred embodiments, in addition to the lubricants.

Both the lubricants and the dextran should have a high purity to meet federal standards for use in foods for human consumption. For example, the dextran should be pyrogen free and meet USP requirements and specifications.

The amount of lubricant used is about 0.1% to 1.0% the weight of the dried juice, with about 0.5% being preferred.

The amount of dextran used and the molecular weight of the dextran are inversely related. That is, small amounts of high molecular weight dextran or larger amounts of low molecular weight dextran may be used in the present invention. Further, for a particular molecular weight, increasing the amount of dextran increases the dryness of the dried juice.

By way of example, for dextran having a molecular weight of approximately 40,000 to 75,000, the amount of dextran used may be approximately one-quarter parts by weight of the total carbohydrate content of the juice. Dextran having a molecular weight of approximately 10,000 to 40,000 may be dissolved in approximately equal parts by weight of the total carbohydrate content of the juice. Dextran having a higher molecular weight of approximately 75,000 to 40,000,000 may be dissolved in approximately one-tenth parts by weight of the total carbohydrate content of the juice.

The total carbohydrate content of the juice is typically about 10% of the weight of the fresh juice. For example, orange juice is about 12% total solids (88% water) and about 80% of the total solids are sugars known as the total carbohydrate. Total carbohydrates are typically 40% sucrose, 30% dextrose and 30% fructose.

The amount of dextran used can also be based on the presence or absence of the lubricants. When the lubricants are used, the amount of dextran can be less than the above-identified amounts. For example, 40,000–75,000 molecular weight dextran in an amount 0.3% the weight of the juice may be appropriate when lubricants are to be used.

In the preferred embodiments of the method of the present invention the fresh juice may be filtered to remove seeds and heavy pulp. High molecular weight dextran (molecular weight 5,000,000 to 40,000,000) is mixed with the fresh juice in an amount equal to about two percent of the weight of the fresh juice. The mixture is freeze dried in a conventional process to produce an amorphous mass. The amorphous mass may be frozen to form a solid that may be reduced to a powder by conventional processes, such as crushing or grinding. A small amount (about 0.3% the weight of the powder) of zinc or calcium stearate is mixed with the powder to keep it free flowing. The resulting powder will remain free flowing and can be stored at or slightly above normal room temperatures. No preservatives need be added because of the high concentration of self-preserving sugars. The powder may be reconstituted to a juice by the addition of water in an amount approximately equal to the amount of water removed during drying.

The lubricants in the above embodiment may also be added by coating the pans in which the juice is freeze dried with the lubricants. When the depth of the juice in the pans is approximately one-quarter inch or less, no further lubricants need be added. Thicker layers of juice may be more easily made into a free-flowing powder by a subsequent application of lubricant.

In a further embodiment of the present invention, the amorphous mass formed as set forth in the preceding paragraph may be rolled into a sheet, rather than frozen. The sheet may be surface coated with the lubricant and rolled into a cylindrical shape that may be cut into bite-sized pieced for direct consumption without being reconstituted. The pieces have a taffy-like consistency suitable for use as snack.

In a further embodiment, the fresh juice may be spray dried, instead of freeze dried.

In yet a further embodiment, the use of dextran may be avoided altogether. For example, the fresh juice may be dried to produce a sticky, amorphous mass. The mass may be frozen to a solid and reduced to powder. The lubricants may be mixed with the powder to keep if free flowing. Alternatively, the lubricants may be added before the juice is dried and the step of freezing the mass may be omitted.

The below described tests are exemplary of the various embodiments of the present invention. In each test, the juice was fresh orange juice and the drying process was freeze drying. Dextrans having a molecular weight of 5,000,000 to 40,000,000 (HMW) and having a molecular weight of 60,000 to 90,000 (LMW) were used. Both zinc stearate (Zn) and calcium stearate (Ca) were also used.

Test 1

Conditioner mixed with fresh juice:
Dextran—none
Stearate—none
Conditioner applied to the surface of the dried juice:
Dextran—LMW about 2.0% weight of fresh juice
Stearate—Zn about 0.3% weight of dried juice
Results—particle size about ⅛ inch average diameter, good to excellent flow properties, reconstitutes with water.

Test 2

Conditioner mixed with fresh juice:
Dextran—HMW about 2.0% weight of fresh juice
Stearate—none
Conditioner (zinc stearate) coated on the surface of the pan in which juice was freeze dried:
Dextran—none
Stearate—for juice layers more then ¼ inch thick, Zn about 0.3% weight of dried juice was added to powder
Results—excellent flow properties, reconstitutes with water.

Test 3

Conditioner mixed with fresh juice:
Dextran—LMW about 0.35% weight of fresh juice
Stearate—none
Conditioner applied to the surface of the dried juice:
Dextran—none
Stearate—Ca about 0.3% weight of dried juice
Results—particle size less than 1/64 inch average, excellent flow properties, reconstitutes with water.

Test 4

Conditioner mixed with fresh juice:
Dextran—LMW about 2.14% weight of fresh juice
Stearate—none
Conditioner applied to the surface of the dried juice:
Dextran—none
Stearate—Ca about 0.1% of weight of dried juice
Results—particle size less than 1/64 inch average, excellent flow properties, reconstitutes with water.

Test 5

Conditioner mixed with fresh juice:
Dextran—none
Stearate—none
Conditioner mixed with the powderized dry juice:
Dextran—none
Stearate—Zn about 0.5% of weight of dried juice
Results—excellent flow properties, reconstitutes with water.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a perusal hereof.

I claim:

1. A method of preparing a juice concentrate comprising the steps of:
   a. filtering a juice to remove seeds and heavy pulp;
   b. drying the filtered juice to form a concentrate; and
   c. adding a predetermined amount of a lubricant selected from the group of stearates comprising zinc stearate and calcium stearate to reduce the adhesiveness of the concentrate.

2. The method as defined in claim 1 wherein said lubricant is added to the filtered juice.

3. The method as defined in claim 1 wherein said lubricant is added to the concentrate.

4. The method as defined in claim 1 further comprising the step of freezing the dried juice mixture before adding the lubricant.

5. The method as defined in claim 1 wherein the filtered juice is dried by freeze drying.

6. The method as defined in claim 1 wherein the filtered juice is dried by spray drying.

7. A method of manufacturing a powder able to be reconstituted as a drink by the addition of water thereto comprising the steps of:
   a. mixing dextran with a juice, the amount of dextran ranging from about 1% to 10% the weight of the juice;
   b. drying the juice mixture;
   c. rendering the dried juice mixture to a powder; and
   d. adding a predetermined amount of a lubricant so that the powder remains free flowing.

8. The method as defined in claim 7 wherein said dextran has a molecular weight of between 5,000,000 and 40,000,000 and wherein the amount of dextran mixed with the juice is between approximately 1% and 3% by weight of the juice.

9. The method as defined in claim 8 wherein the juice mixture is freeze dried in a pan having juice mixture containing sides coated with said lubricant.

10. The method as defined in claim 9 wherein the powder is combined with an amount of zinc stearate that is about 0.5% by weight of the freeze dried juice mixture.

11. The method as defined in claim 7 wherein said lubricant is selected from the group of stearates comprising zinc stearate and calcium stearate.

12. The method as defined in claim 11 wherein the predetermined amount of said lubricant is between about 0.1 and 1.0 percent by weight of the dried juice mixture.

13. The method as defined in claim 7 wherein said lubricant is added to the juice mixture.

14. The method as defined in claim 7 wherein said lubricant is added to the dried juice mixture.

15. The method as defined in claim 7 wherein said lubricant is added to the powder.

16. The method as defined in claim 7 further comprising the step of freezing the dried juice mixture before rendering to a powder.

17. The method as defined in claim 7 wherein said juice mixture is dried by freeze drying.

18. The method as defined in claim 17 wherein the juice mixture is freeze dried in a pan and wherein the lubricant is added by coating the juice mixture holding surfaces of the pan with the lubricant.

19. The method as defined in claim 7 wherein said juice mixture is dried by spray drying.

20. The method as defined in claim 7 further comprising the step of filtering the juice that is to be mixed with the dextran to remove seeds and heavy pulp.

21. The method as defined in claim 7 wherein said dextran has a high purity and a molecular weight in the range of 10,000 to 40,000,000.

22. A method of making a juice concentrate that may be consumed without being reconstituted comprising the steps of:
   a. mixing dextran with a juice, the amount of dextran ranging from about 1% to 10% the weight of the juice;
   b. drying the juice mixture to form a taffy-like concentrate; and
   c. coating surfaces of the taffy-like concentrate with a predetermined amount of a lubricant.

23. The method as defined in claim 22 wherein said lubricant is selected from the group of stearates comprising zinc stearate and calcium stearate.

24. The method as defined in claim 23 wherein the predetermined amount of said lubricant is between about 0.1 and 1.0 percent by weight of the coagulated concentrate.

25. The method as defined in claim 22 wherein said juice mixture is dried by freeze drying.

26. The method as defined in claim 25 wherein the juice mixture is freeze dried in a pan and wherein the lubricant is added to a surface of the taffy-like concentrate by coating the juice mixture holding surfaces of the pan with the lubricant.

27. The method as defined in claim 22 wherein said juice mixture is dried by spray drying.

28. The method as defined in claim 22 wherein said dextran has a high purity and a molecular weight in the range of 10,000 to 40,000,000.

29. The method as defined in claim 22 further comprising the step of forming pieces of the coated concentrate that may be consumed.

30. A powder able to be reconstituted as a juice drink by the addition of water thereto, the powder comprising a dehydrated juice and a lubricant selected from the group of stearates comprising zinc stearate and calcium stearate.

31. A powder able to be reconstituted as a juice drink by the addition of water thereto, the powder comprising a dehydrated juice and dextran, wherein said dextran has a predetermined molecular weight in the range of 10,000 to 40,000,000, the amount of dextran ranging from about one-tenth to equal parts by weight of the total carbohydrate content of the juice before it is dehydrated and being inversely related to the predetermined molecular weight.

* * * * *